May 20, 1969
H. T. TYTUS
3,444,943
WEIGHING SYSTEM WITH SEALED ENCLOSURE
Filed Aug. 28, 1967
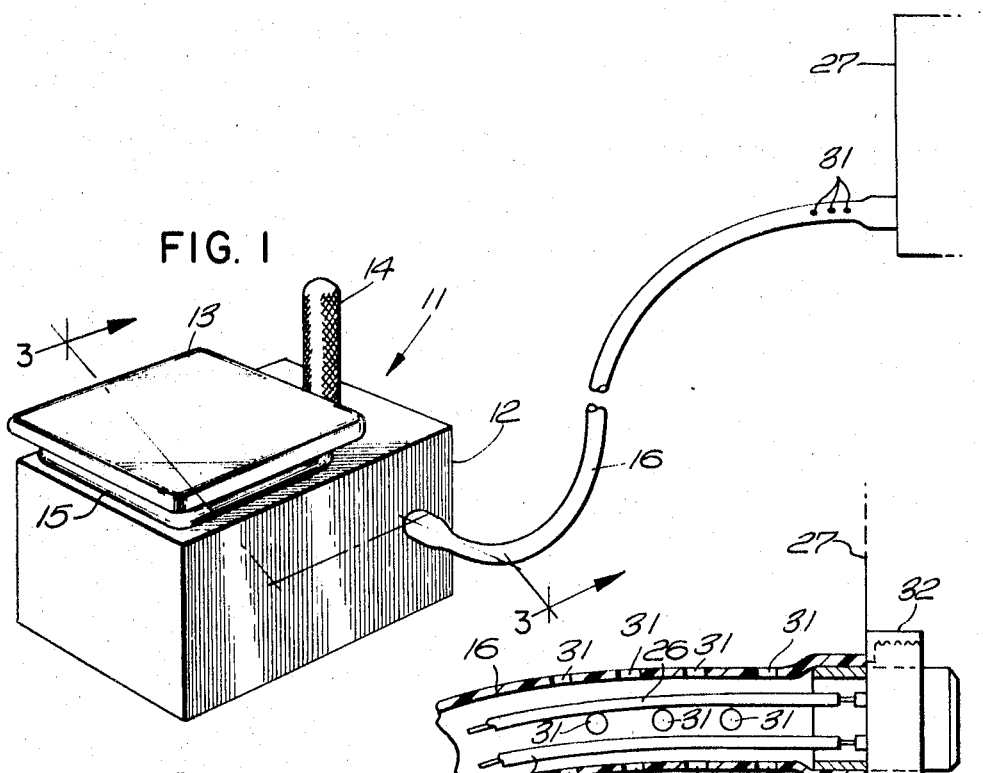
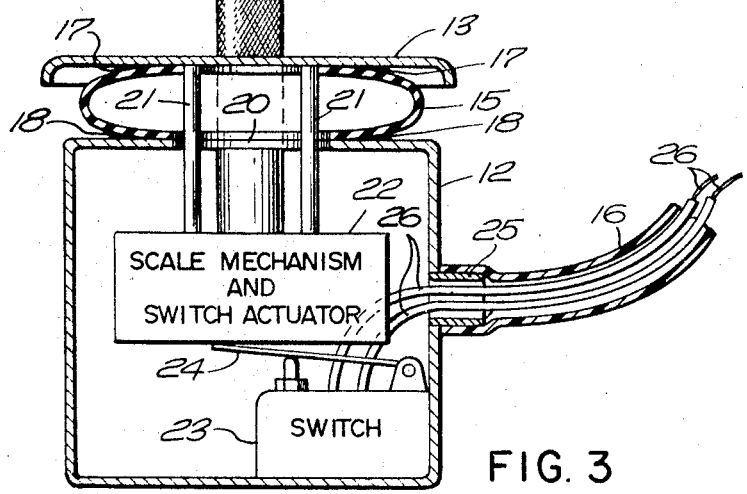
INVENTOR.
HULBERT T. TYTUS
BY
ATTORNEY United States Patent Office 3,444,943
Patented May 20, 1969

3,444,943
WEIGHING SYSTEM WITH SEALED ENCLOSURE
Hulbert T. Tytus, 56 Hancock St.,
Cambridge, Mass. 02138
Filed Aug. 28, 1967, Ser. No. 663,594
Int. Cl. G01g 21/28
U.S. Cl. 177—180                                    6 Claims

ABSTRACT OF THE DISCLOSURE

A weighing system having a scale platform and a variable volume sealed enclosure which is provided with an air breather tube to allow the interior of the enclosure to remain at atmospheric pressure despite volume changes. The air breather tube provides a protective conduit for the wires from the electromechanical scale-relay mechanism within the enclosure as well as providing air breathing means remote from the enclosure. The volume of the enclosure varies directly with movement of the scale platform.

Field of the invention

This invention relates in general to weighing systems and more particularly to a novel weighing relay system, having scale and switch apparatus sealed within an enclosure which has remote air breathing means to maintain the interior thereof at environmental pressure.

Discussion of the prior art

The uses of an automatically controlled unit for dispensing predetermined weights of fluid from a fluid reservoir into a fluid receiving container are widespread in the food and drink industry, an example of which is described in applicant's United States Patent No. 3,335,807. However, where liquids are being measured or otherwise handled, there is necessarily a certain amount of overflow and spillage. Under such conditions the scale mechanism is subject to considerable and relatively continuous dampness, which tends to become sticky after a short time. Where the scale mechanism involves electromechanical apparatus, such environmental conditions tend to have adverse effects upon both the mechanical and the electrical components of the weighing system and the operation thereof. Placing the scale mechanism within an enclosure is a partial solution to the problem of the presence of foreign matter. However, due to the fact that the scale platform must rise and fall as it is conitnually used for weighing, exposure of the portions of the system which move relative to one another presents additional problems. Since many of the fluids which are weighed by the weighing system tend to become sticky, they will eventually retard motion of the scale platform where it slides into the enclosure containing the scale mechanism. Another problem associated with a sealed enclosure is as the scale platform rises and falls, the internal pressure in the enclosure will vary. An increase in internal pressure will result in an increased force necessary to depress the platform while decreased pressure provides the opposite effect. Any holes in the enclosure designed to maintain the pressure therein constant would allow liquid to enter the enclosure and eventually destroy the effectiveness of the system.

Summary of the invention

Broadly speaking, this invention is designed to provide a scale mechanism which is fully sealed and impervious to liquids which are part of the environment in which the weighing system operates. The sealed enclosure is provided with remote air breathing means so that air pressure therein is maintained constant and has no effect upon the motion of the scale platform.

The novel weighing system of this invention generally comprises an enclosure for the electromechanical scale-relay apparatus and a weighing platform which is hermetically sealed to the enclosure by means of a flexible bellows. A flexible tube is hermetically sealed to an opening in the enclosure to provide a protective conduit for the wires from the electromechanical scale-relay apparatus within the enclosure and additionally provides air breathing means remote from the enclosure. This remote air breathing means prevents liquids from entering the enclosure while maintaining the enclosure at atmospheric pressure. It is necessary to maintain constant internal pressure because the force required to move the scale platform and its associated bellows would, without air breathing means, be dependent upon pressure changes within the enclosure. Such pressure changes would result from the movement of the scale platform and the bellows which, in effect, change the internal volume of the enclosure. However, with remote air breathing means, the sealed weighing system of this invention may be used in applications where liquids are likely to be spilled during the weighing process without adverse effects upon scale sensitivity.

Brief description of the drawing

FIG. 1 is a perspective view of the weighing system of this invention;

FIG. 2 is a cross section of the remote air breathing end of the flexible tube shown in FIG. 1; and FIG. 3 is a cross section of the weighing system of this invention including the proximate end of the air breather tube.

Description of the preferred embodiment

Referring now to the drawing, FIG. 1 presents an overall perspective of the weighing system of this invention, while FIGS. 2 and 3 provide details of the system shown in FIG. 1.

The weighing system is referred to generally by reference numeral 11 and comprises an enclosure 12, scale platform 13, scale mechanism adjustment 14, bellows 15 and flexible air breather tube 16. As shown in more detail in FIG. 3, the bellows 15 is hermetically sealed by appropriate adhesive means to scale platform 13 at points 17 and to the top of enclosure 12 at points 18. Platform 13 is attached to the upper ends of posts 21, while the lower ends of the posts are connected to scale mechanism and switch actuator 22. These posts pass through an opening 20 in the top of enclosure 12. The entire central portion of the top of enclosure 12 through which posts 21 pass is open to the interior of bellows 15. Bellows 15 is shown as a single, annular, flexible element which may be made of rubber or plastic, for example. Scale adjustment 14 has a rotatable knurled knob which is connected by a linkage (not shown) to scale mechanism 22. Scale adjustment 14 provides adjustments to scale mechanism 22 which allow substantial variations in the amount of force necessary to depress scale platform 13 a predetermined distance. Also included within enclosure 12 is electrical switch 23 which is actuated by contact 24 which is in turn operated by scale mechanism and switch actuator 22.

Enclosure 12 is formed with a bushing 25 which provides access to the interior of enclosure 12. Electrical wires 26 which are connected to switcth 23 pass through bushing 25 and extend to remote electrical apparatus 27 as shown in FIG. 1. Electrical apparatus 27 may be a dispensing device which is controlled by weighing system 11 or it may be a switchboard or panel for distribution of the control signals from the weighing system. Flexible air breather tube 16 is hermetically sealed to bushing 25 and provides a protective conduit for electrical wires 26 between enclosure 12 and electrical apparatus 27 as well as providing remote air breathing means for enclosure 12. The interior of enclosure 12 is thus hermetically sealed so that liquids which might be spilled over it cannot enter.

Since the internal volume of the combination of enclosure 12 and bellows 15 decreases when platform 13 is depressed, it is necessary that air escape from enclosure 12 in order to prevent the motion of platform 13 from effecting an increase in pressure within the enclosure. That is, without such air escape, the resulting increase in air pressure would mean that an increased force would then be necessary to depress platform 13. For this reason air breather tube 16 is provided with a plurality of holes 31 at its distal end which is remote from weighing system 11. Air breather tube 16 may be of any length and is thus shown broken in FIG. 1. It may be made of any suitable material such as plastic which is axially flexible but maintains a substantially rigid cross section under normal use in order to allow free air flow in both directions and to protect the enclosed electrical wires.

Wires 26 are shown coextensive with flexible air breather tube 16 and are connected at the end of tube 16 to a standard electrical connector 32 which attaches both tube 16 and wires 26 to electrical apparatus 27. Enclosure 12 is thus provided with two-way air flow through air breather tube 16 and holes 31 to the atmosphere without the danger of contamination of the apparatus therein. With this device the pressure does not increase within enclosure 12 when platform 13 is depressed and it does not decrease when platform 13 is allowed to rise by the action of scale mechanism 22 when the force on platform 13 is removed.

In operation, weighing system 11 may be placed beneath a fluid reservoir valve as described in applicant's United States Patent No. 3,335,807. A liquid container may be placed upon platform 13 and a starting switch operated to commence flow of the liquid from the reservoir into the container. As the container fills, its weight increases and platform 13 is slowly depressed until such time as scale mechanism and switch actuator 22 operate contact 24 which actuates switch 23. Switch 23 initiates a signal which, through wire 26, closes the valve and discontinues flow of liquid from the reservoir. In this instance, electrical apparatus 27 may be the control device for the valve associated with the liquid reservoir.

As stated previously, wherever liquid dispensers are involved, spillage and leakage are common occurrences and tend to maintain the outer surfaces of weighing system 11 in a damp condition. With air breather holes 31 maintained at a remote location from sealed weighing system 11, there is no danger that the spilled liquids will find their way into the interior of enclosure 12. The operability of electromechanical apparatus within enclosure 12 is fully protected from deterioration caused by the dampness in the environment in which the weighing system must operate. It should be noted, however, that this invention is not limited to applications suggested by Patent No. 3,335,807, nor should it be limited to the food and drink industry. It has application in any place where weighing must be conducted in an environment where liquids tend to be spilled upon the weighing system.

In view of the foregoing, it will be clear that many modifications of this invention may now be made by those skilled to the art without departing from the underlying concept thereof.

What is claimed is:
1. A weighing system having a displaceable scale platform, comprising:
   a sealed enclosure;
   an electromechanical scale mechanism inside said enclosure, said scale mechanism being adapted to produce a signal responsive to a predetermined displacement of said scale platform;
   flexible means for hermetically sealing said scale platform to said enclosure, the interior of said flexible means being open to the interior of said enclosure;
   a flexible tube hermetically sealed to and extending from said enclosure, the interior of said tube communicating with the interior of said enclosure;
   electrical wires connected to said scale mechanism, said wires extending within said flexible tube; and
   means formed in said flexible tube remote from said enclosure to provide free communication between the ambient environment and the interior of said sealed enclosure.
2. A weighing system as in claim 1, wherein:
   said tube is axially flexible and maintains a substantially rigid cross section.
3. A weighing system as in claim 2, wherein:
   said last mentioned means include a plurality of holes through the wall of said tube remote from said sealed enclosure.
4. A weighing system as in claim 3, wherein:
   said flexible means for hermetically sealing said scale platform to said enclosure comprises a bellows, said bellows being sealed to said scale platform and to said sealed enclosure, the interior of said bellows being open to the interior of said enclosure.
5. A weighing system as in claim 4, and further comprising:
   electrical apparatus controlled by said signal from said electromechanical scale mechanism, said electrical wires connecting said electrical apparatus to said electromechanical scale mechanism.
6. A weighing system as in claim 5, and further comprising:
   means for adjusting said scale mechanism to vary the force required for said predetermined displacement of said platform.

References Cited

UNITED STATES PATENTS

| | | | |
|---|---|---|---|
| 2,805,055 | 9/1957 | Swanson | 177—239 XR |
| 3,194,332 | 7/1965 | Weidemann | 117—241 |
| 3,194,332 | 7/1965 | Weidemann | 177—241 |
| 3,335,807 | 8/1967 | Tytus | 177—79 |

OTHER REFERENCES

Instruments, vol. 26, No. 6, June 1953, page 830; class 177–180; copy in group 282.

ROBERT S. WARD, JR., *Primary Examiner.*

U.S. Cl. X.R.

177—243